US012620646B2

(12) United States Patent　　(10) Patent No.: US 12,620,646 B2

Kumar　　(45) Date of Patent: May 5, 2026

---

(54) BATTERY THERMAL RUNWAY DETECTION/PREVENTION

(71) Applicant: HONEYWELL INTERNATIONAL INC., Charlotte, NC (US)

(72) Inventor: Nirmal A. Kumar, Bangalore KA (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 931 days.

(21) Appl. No.: 17/655,594

(22) Filed: Mar. 21, 2022

(65) Prior Publication Data

US 2023/0253643 A1　　Aug. 10, 2023

(30) Foreign Application Priority Data

Feb. 7, 2022　(IN) .............................. 202211006363

(51) Int. Cl.
　*H01M 10/633*　　(2014.01)
　*H01M 10/0525*　　(2010.01)
　　　　(Continued)

(52) U.S. Cl.
　CPC ..... *H01M 10/633* (2015.04); *H01M 10/0525* (2013.01); *H01M 10/486* (2013.01);
　　　　(Continued)

(58) Field of Classification Search
　CPC ............. H01M 10/0525; H01M 10/48; H01M 10/482; H01M 10/486; H01M 10/613;
　　　　(Continued)

(56) References Cited

U.S. PATENT DOCUMENTS

| | | |
|---|---|---|
| 11,085,356 B2 | 8/2021 | Mendez Abrego et al. |
| 2014/0072839 A1* | 3/2014 | Park ...................... H01M 10/63 429/50 |
| 2019/0173135 A1* | 6/2019 | Iguchi ................. H01M 10/613 |

FOREIGN PATENT DOCUMENTS

| | | |
|---|---|---|
| CN | 113437398 A | 9/2021 |
| CN | 113644339 A | 11/2021 |
| DE | 102014219267 A1 | 3/2016 |

OTHER PUBLICATIONS

European search report Mailed on Jun. 21, 2024 for EP Application No. 23154431, 9 page(s).

(Continued)

*Primary Examiner* — Lingwen R Zeng

(74) *Attorney, Agent, or Firm* — Alston & Bird LLP

(57)　　　　ABSTRACT

Devices, assemblies, and associated methods for identifying a thermal runaway condition are provided. An example battery component comprises a plurality of battery cells disposed within a housing; and a battery cooling system operatively coupled to the plurality of battery cells that is configured to absorb heat emitted by the plurality of battery cells, wherein: at least a first portion of the battery cooling system is associated with at least a first battery cell and a first sensing element that is configured to obtain at least a first measurement associated with the first portion of the battery cooling system, and at least a second portion of the battery cooling system is associated with at least a second battery cell and a second sensing element that is configured to obtain at least a second measurement associated with the second portion of the battery cooling system.

9 Claims, 5 Drawing Sheets

(51) Int. Cl.

| | |
|---|---|
| *H01M 10/48* | (2006.01) |
| *H01M 10/613* | (2014.01) |
| *H01M 10/6552* | (2014.01) |
| *H01M 10/42* | (2006.01) |
| *H01M 10/617* | (2014.01) |
| *H01M 10/625* | (2014.01) |
| *H01M 10/63* | (2014.01) |
| *H01M 10/6556* | (2014.01) |
| *H01M 10/6567* | (2014.01) |
| *H01M 10/6568* | (2014.01) |

(52) U.S. Cl.

CPC ..... *H01M 10/613* (2015.04); *H01M 10/6552* (2015.04); *H01M 2010/4271* (2013.01); *H01M 10/48* (2013.01); *H01M 10/482* (2013.01); *H01M 10/617* (2015.04); *H01M 10/625* (2015.04); *H01M 10/63* (2015.04); *H01M 10/6556* (2015.04); *H01M 10/6567* (2015.04); *H01M 10/6568* (2015.04); *H01M 2220/20* (2013.01); *Y02E 60/10* (2013.01)

(58) Field of Classification Search

CPC .. H01M 10/617; H01M 10/625; H01M 10/63; H01M 10/633; H01M 10/6552; H01M 10/6556; H01M 10/6567; H01M 10/6568; H01M 2010/4271; H01M 2220/20; Y02E 60/10

See application file for complete search history.

(56) References Cited

OTHER PUBLICATIONS

Koch, Sascha et al., "Fast Thermal Runaway Detection for Lithium-Ion Cells in Large Scale Traction Batteries," Batteries, 4(2):16, (2018), 11 pgs.

* cited by examiner

400

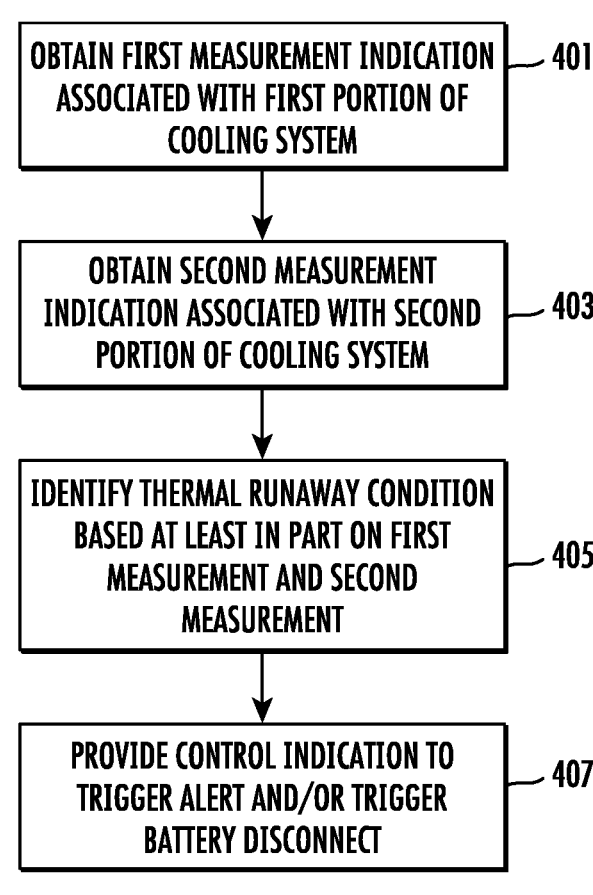

OBTAIN FIRST MEASUREMENT INDICATION ASSOCIATED WITH FIRST PORTION OF COOLING SYSTEM — 401

OBTAIN SECOND MEASUREMENT INDICATION ASSOCIATED WITH SECOND PORTION OF COOLING SYSTEM — 403

IDENTIFY THERMAL RUNAWAY CONDITION BASED AT LEAST IN PART ON FIRST MEASUREMENT AND SECOND MEASUREMENT — 405

PROVIDE CONTROL INDICATION TO TRIGGER ALERT AND/OR TRIGGER BATTERY DISCONNECT — 407

FIG. 4

BATTERY THERMAL RUNWAY DETECTION/PREVENTION

CROSS-REFERENCE TO RELATED APPLICATIONS

This application claims priority to Indian Application No. 202211006363, filed Feb. 7, 2022, the contents of which are hereby incorporated herein in its entirety by reference.

TECHNOLOGICAL FIELD

Example embodiments of the present disclosure relate generally to battery assemblies and, more particularly, to devices, systems, assemblies, and methods for detecting and mitigating thermal runaway.

BACKGROUND

Batteries (e.g., lithium-ion batteries) may be used to supply power a variety of devices (e.g., portable electronic devices, electric vehicles, and the like) so that these devices may perform their intended operations. The inventors have identified numerous deficiencies with these existing technologies in the field, the remedies for which are the subject of the embodiments described herein.

BRIEF SUMMARY

Apparatuses, devices, systems, assemblies, and associated methods of identifying a thermal runaway condition with respect to a battery component are provided. In some examples, a battery component is provided. The example battery component may comprise a plurality of battery cells disposed within a housing; a battery cooling system operatively coupled to the plurality of battery cells that is configured to absorb heat emitted by the plurality of battery cells, wherein: at least a first portion of the battery cooling system is associated with at least a first battery cell and a first sensing element that is configured to obtain at least a first measurement associated with the first portion of the battery cooling system, and at least a second portion of the battery cooling system is associated with at least a second battery cell and a second sensing element that is configured to obtain at least a second measurement associated with the second portion of the battery cooling system; and a controller component in electronic communication with the first sensing element and the second sensing element.

In some examples, the controller component is configured to: obtain a first measurement indication via the first sensing element; obtain a second measurement indication via the second sensing element; and identify a thermal runaway condition associated with at least one of the plurality of battery cells based at least in part on a difference between the first measurement indication and the second measurement indication.

In some examples, the controller component is further configured to: determine at least one of an average battery cell temperature and a rate of battery temperature change associated with at least one of the plurality of battery cells; determine a predicted measurement associated with the at least a first portion of the of the battery cooling system or the at least a second portion of the battery cooling system; and identify the thermal runaway condition in an instance in which the difference between the average battery cell temperature or the rate of battery temperature change and the predicted measurement satisfies a predetermined threshold value.

In some examples, the controller component is further configured to: in response to identifying the thermal runaway condition, provide a first control indication to trigger deactivating the battery component; and provide a second control indication to generate an alert.

In some examples, the first sensing element and the second sensing element each comprise at least one of a pressure sensor or a temperature sensor, and each of the first measurement indication and the second measurement indication comprises at least one of a pressure value, a rate of pressure change, a temperature value, and a rate of temperature change.

In some examples, the battery component comprises lithium-ion or a lithium polymer.

In some examples, the at least a first portion of the battery cooling system and the at least a second portion of the battery cooling system each comprise one or more cooling pipes that each contain a cooling substance.

In some examples, the at least a first portion of the battery cooling system and the at least a second portion of the battery cooling system are thermally insulated from one another.

In some examples, the cooling substance comprises at least one of a gaseous substance, a coolant, a refrigerant, a liquid substance, and a gel.

In some examples, the battery component is configured for use in at least one of a portable electronic device, an electric vehicle, a robot, a data center, a renewable energy system, an airplane, or a ship.

In some examples, a method for identifying a thermal runaway condition associated with at least one battery cell of a plurality of battery cells disposed within a housing of a battery component is provided. The method may comprise: receiving, by a controller component, a first measurement indication associated with at least a first portion of a battery cooling system that is configured to absorb heat emitted by the plurality of battery cells; receiving, by the controller component, a second measurement indication associated with at least a second portion of the battery cooling system; and identifying, by the controller component, the thermal runaway condition based at least in part on a difference between the first measurement indication and the second measurement indication.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise.

Embodiments incorporating teachings of the present disclosure are shown and described with respect to the figures presented herein, in which:

FIG. 4 illustrates a flowchart diagram depicting example operations in accordance with various embodiments of the present disclosure.

DETAILED DESCRIPTION

Figure 1:
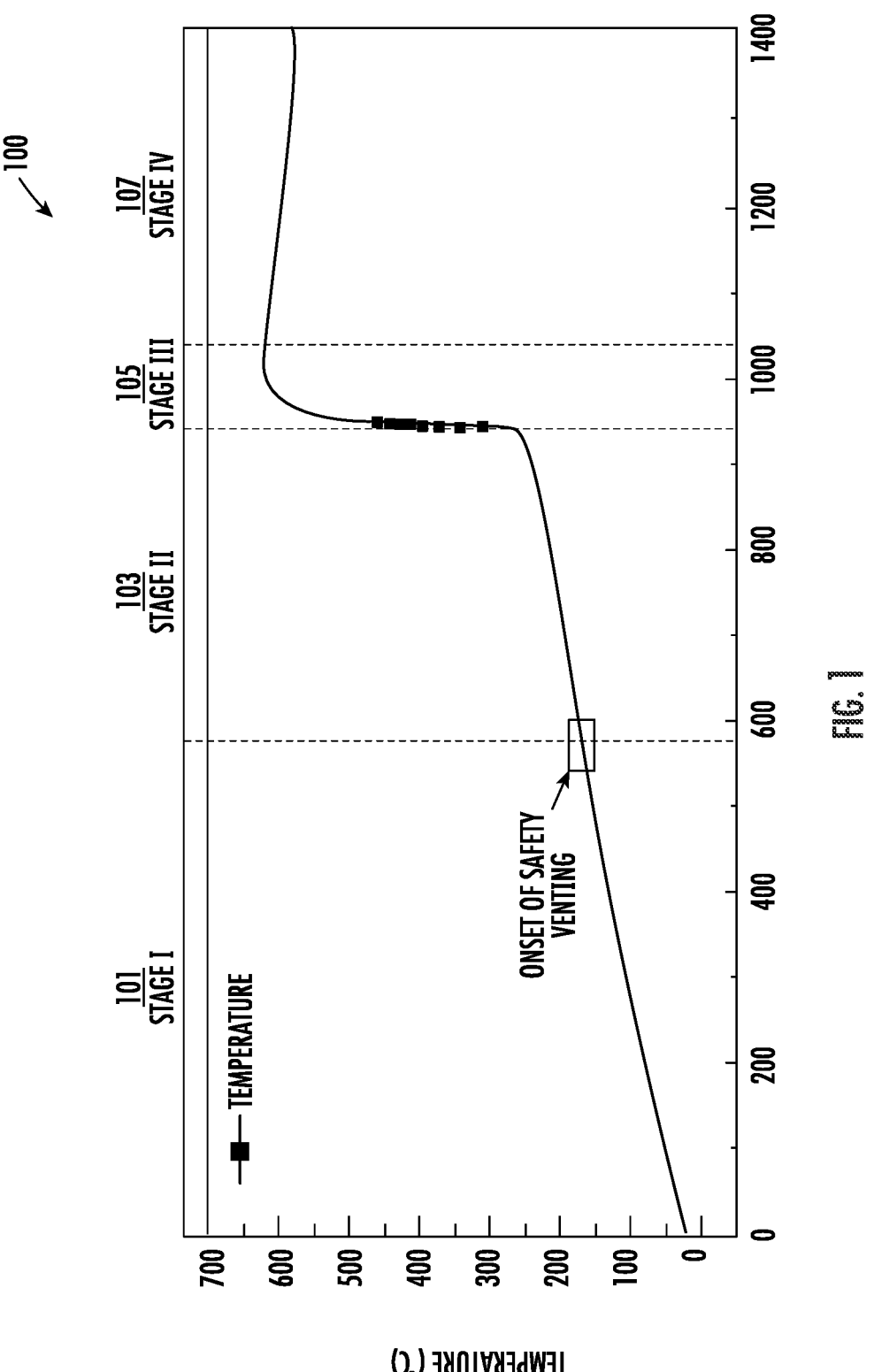
FIG. 1 illustrates an example graph depicting measurement associated with an example battery cell in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "comprising" is used herein to mean "including, but not limited to" and should be interpreted in the manner it is typically used in the context of patent drafting. Use of broader terms such as comprises, includes, and having should be understood to provide support for narrower terms such as consisting of, consisting essentially of, and comprised substantially of.

Terms such as "front," "rear," "top," "bottom," "side," and the like are used herein for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The term "electronically coupled" or "in electronic communication with" in the present disclosure may refer to two or more electrical elements (for example, but not limited to, an example processing circuitry, communication module, input/output module memory, humidity sensing component, cooling element, gas detection component) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The terms "thermal runaway," "thermal explosion," or "runaway reaction," which are used interchangeably herein, may refer to a condition in which a electrical and/or chemical process may be accelerated by an increase in temperature, releasing energy that further drives and/or increases the temperature, and thereby resulting in an uncontrolled reaction. In relation to battery-based devices and/or energy storage and distribution systems, thermal runaway may be driven by increased current flow and power dissipation and can result in a battery overheating, battery fires, and/or battery explosions.

In various examples, batteries (e.g., lithium-ion batteries) may undergo a chemical reaction in order to supply power to various devices and energy storage and distribution systems including, but not limited to, portable electronic devices (e.g., mobile phones, laptops, wearable devices, and the like), electric vehicles/automobiles, drones, robots, data centers, renewable energy systems, airplanes, ships, and/or the like. For example, while a example lithium-ion battery is charging, lithium ions move from a positive electrode/terminal to a negative electrode/terminal through an electrolyte material. When the battery is discharging, the lithium ions move in the opposite direction, from the negative electrode/terminal to the positive electrode/terminal. The example lithium-ion battery may be rechargeable and therefore these chemical reactions may occur repeatedly over the battery's lifecycle (e.g., 100s or 1000s of times). These batteries (e.g., lithium-ion batteries) may store and supply power to various devices and systems so that these devices and systems may perform their intended operations In some examples, such batteries (e.g., lithium-ion batteries) may be prone to thermal runaway as a result of mechanical, electrical and/or thermal stress and abuse. Examples of mechanical abuse/stress to a battery may include piercing by objects (e.g., nails), crushing, or accidental dropping. Electrical abuse/stress may include overcharging, over-discharging, or external short circuits. Examples of thermal abuse/stress may include exposure to high temperatures, fire, or radiation. Such conditions may generate excess current within a battery causing a buildup of heat and/or gas to accumulate. Accordingly, in various examples, mechanical, electrical, and/or thermal stress and abuse may lead to conditions (e.g., separator defect, such as separator tearing, piercing, and/or collapse) which can result in thermal runaway which may spread from one battery cell to another.

Referring now to FIG. 1, an example graph 100 depicting aspects of thermal runaway with respect to a battery in accordance with some embodiments of the present disclosure is provided. As depicted in FIG. 1. the x-axis represents a plurality of instances in time measured in seconds. As depicted, the y-axis represents, for a line of the graph 102, temperature values measured in degrees Celsius (° C.) associated with an example battery cell undergoing thermal runaway as a result of electrical, mechanical and/or thermal abuse.

As illustrated in FIG. 1, during a first stage 101 of thermal runaway, the temperature of a battery cell increases linearly (as depicted, between 0 s and approximately 580 s along the x-axis). During the first phase 101, the temperature of the example battery cell rises from approximately 25° C. to 150° C. along the y-axis.

As further depicted in FIG. 1, during a second stage 103 of thermal runaway, the temperature of the example battery cell continues to rise (as depicted, between 580 s and 950 s along the x-axis). In particular, as shown, the temperature of the example battery cell rises from approximately 150° C. to 250° C. along the y-axis. As depicted, during the second stage 103 of thermal runaway, safety venting may begin to occur (as depicted, at approximately 580 s along the x-axis) during which at least a portion of one or more gaseous substances within the battery cell may be released via one or more apertures (e.g., safety vents) disposed on at least one surface of the battery cell. For example, alkyl carbonate electrolytes of an example lithium-ion battery may begin to form/release gaseous substances such as Carbon Dioxide, Methane, Ethene, Fluoroethane, Hydrogen Fluoride, and/or the like.

As illustrated in FIG. 1, during a third stage 105 of thermal runaway, the temperature of the example battery cell rises more rapidly (as depicted, between 950 s and approximately 1050 s along the x-axis) and more gaseous substance(s) may be released from the battery cell. In particular, as illustrated, the example battery cell temperature rises from approximately 250° C. to 600° C. along the y-axis. Additionally, during the third stage 105 of thermal runaway, the battery cell may begin to spark, resulting in a fire and/or explosion.

Subsequently, during a fourth stage 107 of thermal runaway, the temperature of the example battery cell begins to decline (as shown, between 1050 s and 1400 s along the x-axis) as the exothermic reaction occurring in relation to the battery cell slows down and subsides. As shown, the the example battery cell temperature declines from a peak of approximately 600° C. to 550° C. along the y-axis. Accordingly, FIG. 1 demonstrates that an observable rise in temperature is recorded prior to and/or in conjunction with thermal runaway. Accordingly, in various examples described herein, by monitoring and/or sensing a battery cell temperature, thermal runaway can be detected, prevented, and/or mitigated.

As noted above, various batteries (e.g., lithium-ion batteries) undergo a chemical reaction in order to generate power for various devices and energy storage and distribution systems. In various examples, thermal runaway may pose a serious safety hazard and can result in fires and/or explosions in the vicinity of an end-user causing injury and/or property damage. In some examples, temperature sensors may be implemented in various applications to monitor the temperature of individual battery cells in order to detect thermal runaway. However, in some applications, a device may include a battery component comprising a large number of battery cells (e.g., a battery component used to power an electric vehicle may comprise hundreds or thousands of individual battery cells). In some examples, gas detectors/sensors may be implemented in battery components in order to detect thermal runaway. However, providing a temperature sensor for monitoring individual battery cells or providing a gas detector/sensor may be technically challenging to implement and/or cost prohibitive. By way of example, due to space and cost constraints, only a small number of temperature sensors may be utilized to monitor a small portion of battery cells within a battery component (e.g., 10 temperature sensors to monitor 5000 battery cells). However, in such examples, due to the small number of monitored battery cells, thermal runaway may still occur and go undetected resulting in injury and/or property damage. For example, thermal runaway may begin in an unmonitored battery cell and spread to nearby/adjacent battery cells without being timely detected by a monitored battery cell. In another example, many gas detectors can only detect late stages of thermal runaway (e.g., at the onset of/subsequent to safety venting during the second stage 103 of thermal runaway, as described above in connection with FIG. 1). Accordingly, such gas detectors may only be suitable for providing a warning when it is already to late to prevent/mitigate thermal runaway. For example, once safety venting begins and gaseous substance(s) are released, a battery cell may be in an irreversible damaged condition. Thus, there is a need for systems and methods that can detect early stages of thermal runaway in order to avoid damage to batteries that can lead to fires or explosions.

In order to address these problems and others, example methods, apparatuses and systems in accordance with various embodiments of the present disclosure are provided.

In some examples, a battery component is provided. The example battery component may comprise a plurality of battery cells disposed within a housing; a battery cooling system operatively coupled to the plurality of battery cells that is configured to absorb heat emitted by the plurality of battery cells, wherein: at least a first portion of the battery cooling system is associated with at least a first battery cell and a first sensing element that is configured to obtain at least a first measurement associated with the first portion of the battery cooling system, and at least a second portion of the battery cooling system is associated with at least a second battery cell and a second sensing element that is configured to obtain at least a second measurement associated with the second portion of the battery cooling system; and a controller component in electronic communication with the first sensing element and the second sensing element. In some examples, the controller component is configured to: obtain a first measurement indication via the first sensing element; obtain a second measurement indication via the second sensing element; and identify a thermal runaway condition associated with at least one of the plurality of battery cells based at least in part on a difference between the first measurement indication and the second measurement indication. In some examples, the controller component is further configured to: determine at least one of an average battery cell temperature and a rate of battery temperature change associated with at least one of the plurality of battery cells; determine a predicted measurement associated with the at least a first portion of the of the battery cooling system or the at least a second portion of the battery cooling system; and identify the thermal runaway condition in an instance in which the difference between the average battery cell temperature or the rate of battery temperature change and the predicted measurement satisfies a predetermined threshold value. In some examples, the controller component is further configured to: in response to identifying the thermal runaway condition, provide a first control indication to trigger deactivating the battery component; and provide a second control indication to generate an alert. In some examples, the first sensing element and the second sensing element each comprise at least one of a pressure sensor or a temperature sensor, and each of the first measurement indication and the second measurement indication comprises at least one of a pressure value, a rate of pressure change, a temperature value, and a rate of temperature change. In some examples, the battery component comprises lithium-ion or a lithium polymer. In some examples, the at least a first portion of the battery cooling system and the at least a second portion of the battery cooling system each comprise one or more cooling pipes that each contain a cooling substance. In some examples, the at least a first portion of the battery cooling system and the at least a second portion of the battery cooling system are thermally insulated from one another. In some examples, the cooling substance comprises at least one of a gaseous substance, a coolant, a refrigerant, a liquid substance, and a gel. In some examples, the battery component is configured for use in at least one of a portable electronic device, an electric vehicle, a robot, a data center, a renewable energy system, an airplane or a ship.

In some examples, a method for identifying a thermal runaway condition associated with at least one battery cell of a plurality of battery cells disposed within a housing of a battery component is provided. The method may comprise: receiving, by a controller component, a first measurement indication associated with at least a first portion of a battery cooling system that is configured to absorb heat emitted by the plurality of battery cells; receiving, by the controller component, a second measurement indication associated with at least a second portion of the battery cooling system; and identifying, by the controller component, the thermal runaway condition based at least in part on a difference between the first measurement indication and the second measurement indication. In some examples, the first measurement indication is obtained via a first sensing element that is associated with at least a first portion of the battery cooling system and at least a first battery cell, and the second measurement indication is obtained via a second sensing element that is associated with at least a second portion of the battery cooling system and at least a second battery cell. In some examples, the method further comprises: determining, by the controller component, at least one of an average battery cell temperature or a rate of battery temperature change associated with at least one of the plurality of battery cells; determining, by the controller component, a predicted measurement associated with the at least a first portion of the of the battery cooling system or the at least a second portion of the battery cooling system; and identifying, by the controller component, the thermal runaway condition in an instance in which the difference between the average battery cell temperature or the rate of battery temperature change and the predicted measurement satisfies a predetermined threshold value. In some examples, the method further comprises: in response to identifying, by the controller component, the thermal runaway condition, providing, by the controller component, a first control indication to trigger deactivating the battery component; and providing by the controller component, a second control indication to generate an alert. In some examples, the first sensing element and the second sensing element each comprise at least one of a pressure sensor and a temperature sensor, and each of the first measurement indication and the second measurement indication comprises at least one of a pressure value, a rate of pressure change, a temperature value, and a rate of temperature change. In some examples, the battery component comprises lithium-ion or a lithium polymer. In some examples, the at least a first portion of the battery cooling system and the at least a second portion of the battery cooling system each comprise one or more cooling pipes that each contain a cooling substance. In some examples, the at least a first portion of the battery cooling system and the at least a second portion of the battery cooling system are thermally insulated from one another. In some examples, the cooling substance comprises at least one of a gaseous substance, a coolant, a refrigerant, a liquid substance, and a gel. In some examples, the battery component is configured for use in at least one of a portable electronic device, an electric vehicle, a robot, a data center, a renewable energy system, an airplane, or a ship.

Figure 2:
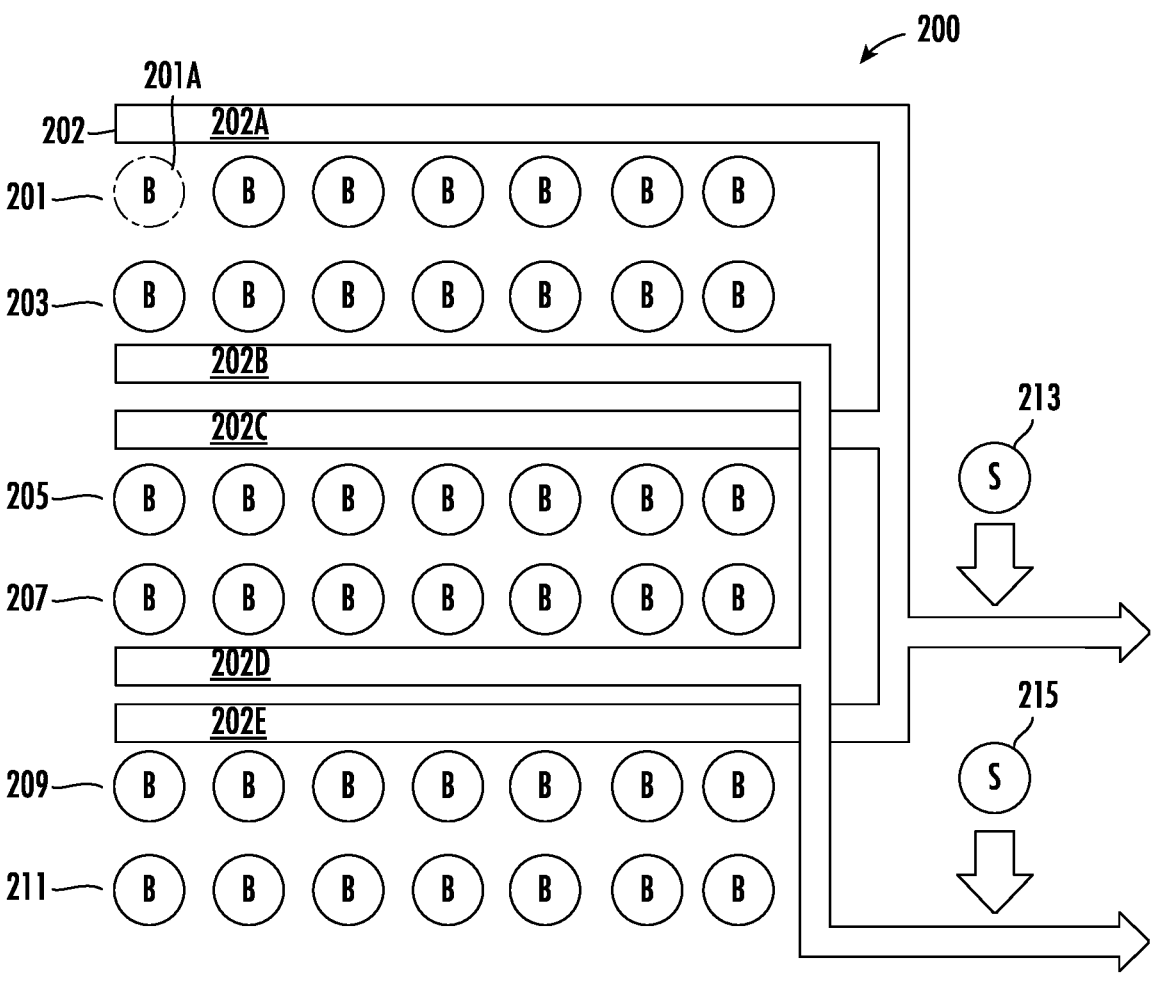
FIG. 2 illustrates an example schematic diagram depicting at least a portion of a battery component in accordance with various embodiments of the present disclosure.

Referring now to FIG. 2, an example schematic diagram depicting at least a portion of a battery component 200 in accordance with some embodiments of the present disclosure is provided. In various embodiments, the example battery component 200 may be or comprise a lithium-ion battery, a lithium polymer (LiPo) battery, or the like. It should be understood that the example battery component 200 may comprise other types battery cell with respect to which temperature changes may be recorded in response to a thermal runway condition including, but not limited to, lead-acid batteries, nickel-cadmium batteries, alkaline batteries, nickel metal hydride (NIMH), or the like. In some embodiments, the battery component 200 supplies power to facilitate operations of various devices and energy storage and distribution systems including, but not limited to, portable electronic devices, electric vehicles, data centers, renewable energy systems, vessels (e.g., airplanes or ships), and/or the like.

In various embodiments, the example battery component 200 may comprises a plurality of battery cells and may further comprise/be integrated with a battery cooling system/thermal management system configured to regulate the temperature of the plurality of battery cells. In various embodiments, the example battery component 200 may be at least partially disposed within a housing and may be configured to be received within a cavity (e.g., opening, recess, depression, or the like) of an example device (e.g., electric vehicle, portable electronic device, or the like) so as to power (e.g., be in electrical communication with) one or more circuitry components or elements of the example device (e.g., electric vehicle, portable electronic device, or the like). In various examples, the example housing may comprise a plastic material, metal, combinations thereof, and/or the like.

As depicted in FIG. 2, the example battery component 200 comprises a plurality of sets of battery cells. In particular, as shown, the example battery component 200 comprises at least a first set of battery cells 201 (defining a first row of battery cells), a second set of battery cells 203, a third set of battery cells 205, a fourth set of battery cells 207, a fifth set of battery cells 209, and a sixth set of battery cells 211.

As further depicted in FIG. 2, the example battery component 200 comprises a battery cooling system 202 defining a plurality of cooling pipes (e.g., passageways, conduits, tubular structures, and/or the like) through which a cooling substance (e.g., air, gaseous substance, liquid and/or the like) may flow through the example battery cooling system

202 in order to regulate the temperature of the plurality of battery cells (e.g., one or more sets of battery cells).

In particular, as illustrated, the example battery cooling system 202 comprises at least a first cooling pipe 202A, a second cooling pipe 202B, a third cooling pipe 202C, a fourth cooling pipe 202D, and a fifth cooling pipe 202E. In various embodiments, the plurality of cooling pipes 202A, 202B, 202C, 202D, and 202E may be operatively connected to one another or, in some examples, may operate independently with respect to one another. The example battery cooling system 202 may operate to absorb heat generated by battery cells disposed adjacent thereto, thereby regulating the internal temperature of the battery component 200. In various embodiments, each of the plurality of cooling pipes 202A, 202B, 202C, 202D, and 202E is configured to contain or house a cooling substance or coolant, such as but not limited to, a gaseous substance (e.g., air), a refrigerant, a liquid (e.g., ethylene glycol, water), gel, and/or the like. In various embodiments, the battery cooling system 202 may be or comprise a convection to air system, a heat exchange system, a liquid based battery cooling system, or the like. For example, a pump may be operatively coupled to the battery cooling system 202 in order to convey a cooling substance (e.g., air, water, coolant, or the like) along the one or more cooling pipes (e.g., cooling pipe 202A) of the battery cooling system 202. In some embodiments, each cooling pipe may be disposed adjacent and/or associated with a particular set (e.g., row) of battery cells. In some embodiments, each cooling pipe may be thermally insulated from one or more other cooling pipes. For example, as illustrated, the first cooling pipe 202A, the third cooling pipe 202C, and the fifth cooling pipe 202E are thermally insulated from the second cooling pipe 202B and the fourth cooling pipe 202D.

As further illustrated in FIG. 2, the first cooling pipe 202A is disposed adjacent/associated with the first set of battery cells 201, the second cooling pipe 202B is disposed adjacent/associated with the second set of battery cells 203, the third cooling pipe 202C is disposed adjacent/associated with the third set of battery cells 205, the fourth cooling pipe 202D is disposed adjacent/associated with the fourth set of battery cells 207, and the fifth cooling pipe 202E is disposed adjacent/associated with the fifth set of battery cells 209. Accordingly each of the cooling pipes 202A, 202B, 202C, 202D, and 202E may be positioned in order to regulate the temperature of a particular set of battery cells (e.g., the first cooling pipe 202A is positioned/configured to regulate the temperature of the first set of battery cells 201). For example, each of the cooling pipes 202A, 202B, 202C, 202D, and 202E may operate to absorb heat generated by one or more battery cells. Additionally, in some embodiments, while heat is absorbed from one or more battery cells, the flow of a cooling substance (e.g., air, water, coolant, or the like) within each of the cooling pipes 202A, 202B, 202C, 202D, and 202E may vary in response to the absorbed heat.

As noted above, each cooling pipe may be thermally insulated from one or more other cooling pipes. In the example shown in FIG. 2, the heat generated by the first set of battery cells 201, the third set of battery cells 205, and the fifth set of battery cells 209 is absorbed by the first cooling pipe 202A, the third cooling pipe 202C, and the fifth cooling pipe 202E. Similarly, the heat generated by the second set of battery cells 203 and the fourth set of battery cells 207 is absorbed by the second cooling pipe 202B and the fourth cooling pipe 202D. In this manner, particular cooling pipes may form or define an independent set, group, or portion of the battery cooling system 202.

As further depicted in FIG. 2, the battery component 200 comprises at least a first sensing element 213 and a second sensing element 215. In various embodiments, the first sensing element 213 and the second sensing element 215 may be configured to obtain (e.g., provide, monitor, or the like) at least one measurement associated with at least a portion of the battery cooling system (e.g., one or more cooling pipes). By way of example, the first sensing element 213 and the second sensing element 215 may each be or comprise a temperature sensor, a pressure sensor, combinations thereof, and/or the like. In various examples, each of the first sensing element 213 and second sensing element 215 may be operatively coupled to (e.g., attached to, disposed adjacent, within, or the like) a particular portion of the battery cooling system 202 (e.g., a particular cooling pipe or a particular set of cooling pipes) in order to obtain information associated with the respective portion of the example battery cooling system 202. In the example shown in FIG. 2, the first sensing element 213 is operatively coupled to a first set of cooling pipes, i.e., the first cooling pipe 202A, the third cooling pipe 202C, and the fifth cooling pipe 202E. Additionally, as depicted, the second sensing element 215 is operatively coupled to a second set of cooling pipes, i.e., the second cooling pipe 202B and the fourth cooling pipe 202D. In some examples, each of the first sensing element 213 and the second sensing element 215 may be at least partially disposed within a cooling pipe, or attached to an external surface of a cooling pipe. In some examples, each of the first sensing element 213 and the second sensing element 215 may be exposed to/in direct contact with a cooling substance (e.g., coolant, gaseous substance, or the like) that is disposed within an example cooling pipe.

As noted above, the first sensing element 213 and the second sensing element 215 may be or comprise one or more pressure sensors, temperature sensors, combinations thereof, and or the like that are configured to obtain at least one measurement associated with at least a portion of a battery cooling system (e.g., temperature value, rate of temperature change, pressure value, rate of pressure change, and/or the like). For example, the first sensing element 213 may be configured to at least one measurement (e.g., temperature value, rate of temperature change pressure value, rate of pressure change, and/or the like) associated with the first cooling pipe 202A, the third cooling pipe 202C, and/or the fifth cooling pipe 202E. Similarly, the second sensing element 215 may be configured to detect at least one parameter (e.g., temperature value, pressure value, and/or the like) associated with the second cooling pipe 202B and the fourth cooling pipe 202D. In various embodiments, the first sensing element 213 and the second sensing element 215 may generate measurements indicating a temperature value, pressure value, and/or the like, and transmit the measurements to processing circuitry/a controller component.

In relation to gaseous substances, the volume of a gaseous substance is directly proportional to its temperature at a constant pressure. This relationship can be described by Charles's law, described below:

$$V = kT$$

Where:

V=volume of a gaseous substance (measured in cubic feet);

T=temperature of the gaseous substance (measured in kelvins); and k=a constant.

Based on the above equation, as the temperature of a gaseous substance increases, the volume of the gaseous substance will also increase proportionally. Accordingly, a detected temperature value and pressure value associated with a gaseous substance (e.g., disposed within one or more cooling pipes) may be related such that one value can be used to determine another. For example, as heat generated by one or more battery cells is absorbed by an adjacent portion of an example battery cooling system (e.g., one or more cooling pipes), the pressure of a cooling substance (e.g., air, coolant, or the like) disposed therein will increase such that the pressure change can be detected by a sensing element (e.g., pressure sensor) associated therewith. With reference to the example depicted in FIG. 2, an increase in temperature in a battery cell from the first set of battery cells 201, the third set of battery cells 205, and/or the a fifth set of battery cells 209 may be associated with an increase in pressure within an adjacent/corresponding portion of the example battery cooling system 202 (e.g., the first cooling pipe 202A, the third cooling pipe 202C, and the fifth cooling pipe 202E). Similarly, as illustrated, an increase in temperature in a battery cell from the second set of battery cells 203 and/or the fourth set of battery cells 207 may be associated with an increase in pressure within an adjacent/corresponding portion of the example battery cooling system 202 (e.g., the second cooling pipe 202B and the fourth cooling pipe 202D. In some embodiments, processing circuitry/a controller component may provide a control indication to trigger deactivation of a battery component 200 responsive to identifying certain conditions associated with at least a portion of a battery cooling system (e.g., an above-threshold temperature value, above-threshold pressure value, and/or the like detected via the first sensing element 213 and the second sensing element 215).

While FIG. 2 provides an example battery component 200, it is noted that the scope of the present disclosure is not limited to the example shown in FIG. 2. In some examples, an example battery component may comprise one or more additional and/or alternative elements, and/or may be structured/positioned differently than those illustrated in FIG. 2. For example, in some embodiments, each sensing element may be or comprise a plurality of sensing elements.

Figure 3:
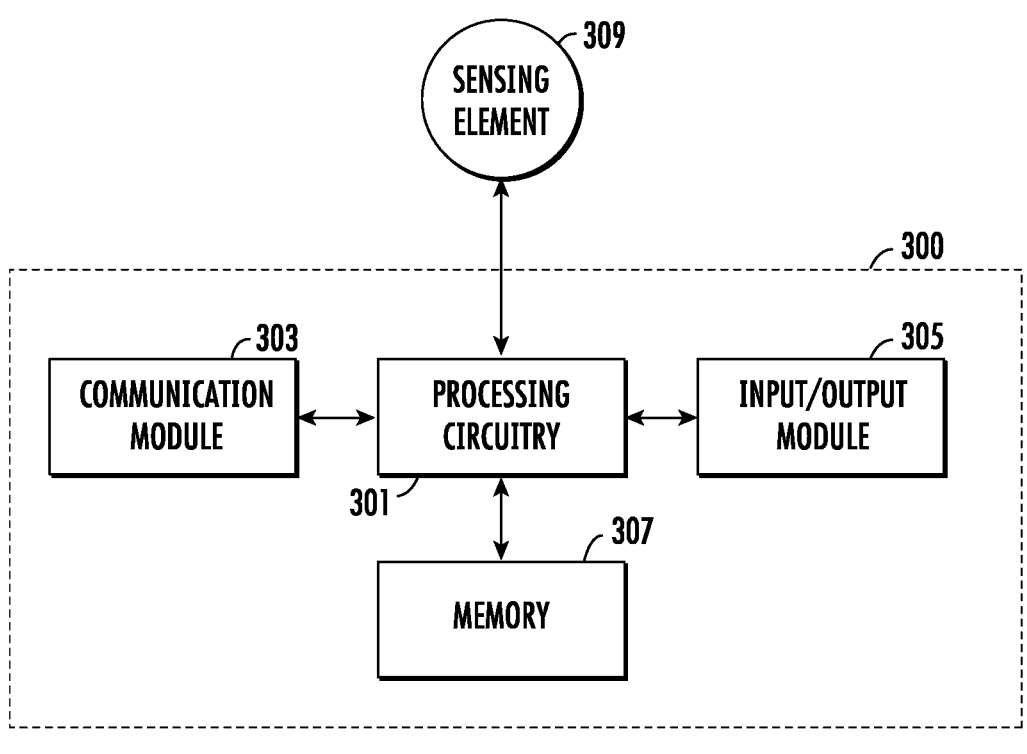
FIG. 3 illustrates a schematic diagram depicting an example controller component in accordance with various embodiments of the present disclosure.

Referring now to FIG. 3, a schematic diagram depicting an example controller component 300 of an example apparatus in electronic communication with various other components in accordance with various embodiments of the present disclosure. As shown, the controller component 300 comprises processing circuitry 301, a communication module 303, input/output module 305, a memory 307, and/or other components configured to perform various operations, procedures, functions or the like described herein.

As shown, the controller component 300 (such as the processing circuitry 301, communication module 303, input/output module 305 and memory 307) is electrically coupled to and/or in electronic communication with at least one sensing element 309. As depicted, the at least one sensing element 309, may exchange (e.g., transmit and receive) data with the processing circuitry 301 of the controller component 300.

The processing circuitry 301 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 301 may comprise one or more processors. In one exemplary embodiment, the processing circuitry 301 is configured to execute instructions stored in the memory 307 or otherwise accessible by the processing circuitry 301. When executed by the processing circuitry 301, these instructions may enable the controller component 300 to execute one or a plurality of the functions as described herein. No matter whether it is configured by hardware, firmware/software methods, or a combination thereof, the processing circuitry 301 may comprise entities capable of executing operations according to the embodiments of the present invention when correspondingly configured. Therefore, for example, when the processing circuitry 301 is implemented as an ASIC, an FPGA, or the like, the processing circuitry 301 may comprise specially configured hardware for implementing one or a plurality of operations described herein. Alternatively, as another example, when the processing circuitry 301 is implemented as an actuator of instructions (such as those that may be stored in the memory 307), the instructions may specifically configure the processing circuitry 301 to execute one or a plurality of algorithms and operations described herein, such as those discussed with reference to FIG. 4 and FIG. 5.

The memory 307 may comprise, for example, a volatile memory, a non-volatile memory, or a certain combination thereof. Although illustrated as a single memory in FIG. 4, the memory 307 may comprise a plurality of memory components. In various embodiments, the memory 307 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 307 may be configured to store information, data, application programs, instructions, and etc., so that the controller component 300 can execute various functions according to the embodiments of the present disclosure. For example, in at least some embodiments, the memory 307 is configured to cache input data for processing by the processing circuitry 301. Additionally or alternatively, in at least some embodiments, the memory 307 is configured to store program instructions for execution by the processing circuitry 301. The memory 307 may store information in the form of static and/or dynamic information. When the functions are executed, the stored information may be stored and/or used by the controller component 300.

The communication module 303 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 307) and executed by a controller component 300 (for example, the processing circuitry 301). In some embodiments, the communication module 303 (as with other components discussed herein) may be at least partially implemented as the processing circuitry 301 or otherwise controlled by the processing circuitry 301. In this regard, the communication module 303 may communicate with the processing circuitry 301, for example, through a bus. The communication module 303 may comprise, for example, antennas, transmitters, receivers, transceivers, network interface cards and/or supporting hardware and/or firmware/software, and is used for establishing communication with another apparatus. The communication module 303 may be configured to receive and/or transmit any data that may be stored by the memory 307 by using any protocol that can be used for communication between apparatuses. The communication module 303 may additionally or alternatively communicate with the memory 307, the input/output module 305 and/or any other component of the controller component 300, for example, through a bus.

In some embodiments, the controller component 300 may comprise an input/output module 305. The input/output module 305 may communicate with the processing circuitry 301 to receive instructions input by the user and/or to provide audible, visual, mechanical or other outputs to the user. Therefore, the input/output module 305 may comprise supporting devices, such as a keyboard, a mouse, a display, a touch screen display, and/or other input/output mechanisms. Alternatively, at least some aspects of the input/output module 305 may be implemented on a device used by the user to communicate with the controller component 300. The input/output module 305 may communicate with the memory 307, the communication module 303 and/or any other component, for example, through a bus. One or a plurality of input/output modules and/or other components may be included in the controller component 300.

For example, the at least one sensing element 309 may be similar to the first sensing element 213 and/or the second sensing element 215 described above in connection with FIG. 2. In some embodiments, at least one sensing element 309 may be or comprise one or more pressure sensors, temperature sensors, combinations thereof, and or the like that are configured to obtain at least one measurement associated with at least a portion of a battery cooling system (e.g., temperature value, pressure value, rate of change of temperature or pressure, and/or the like) and transmit an indication associated with the at least one measurement to the processing circuitry 301. In some embodiments, processing circuitry 301 may provide a control indication to trigger deactivation of a battery component responsive to certain conditions associated with at least a portion of a battery cooling system (e.g., an above-threshold temperature value, above-threshold pressure value, and/or the like).

Figure 5:
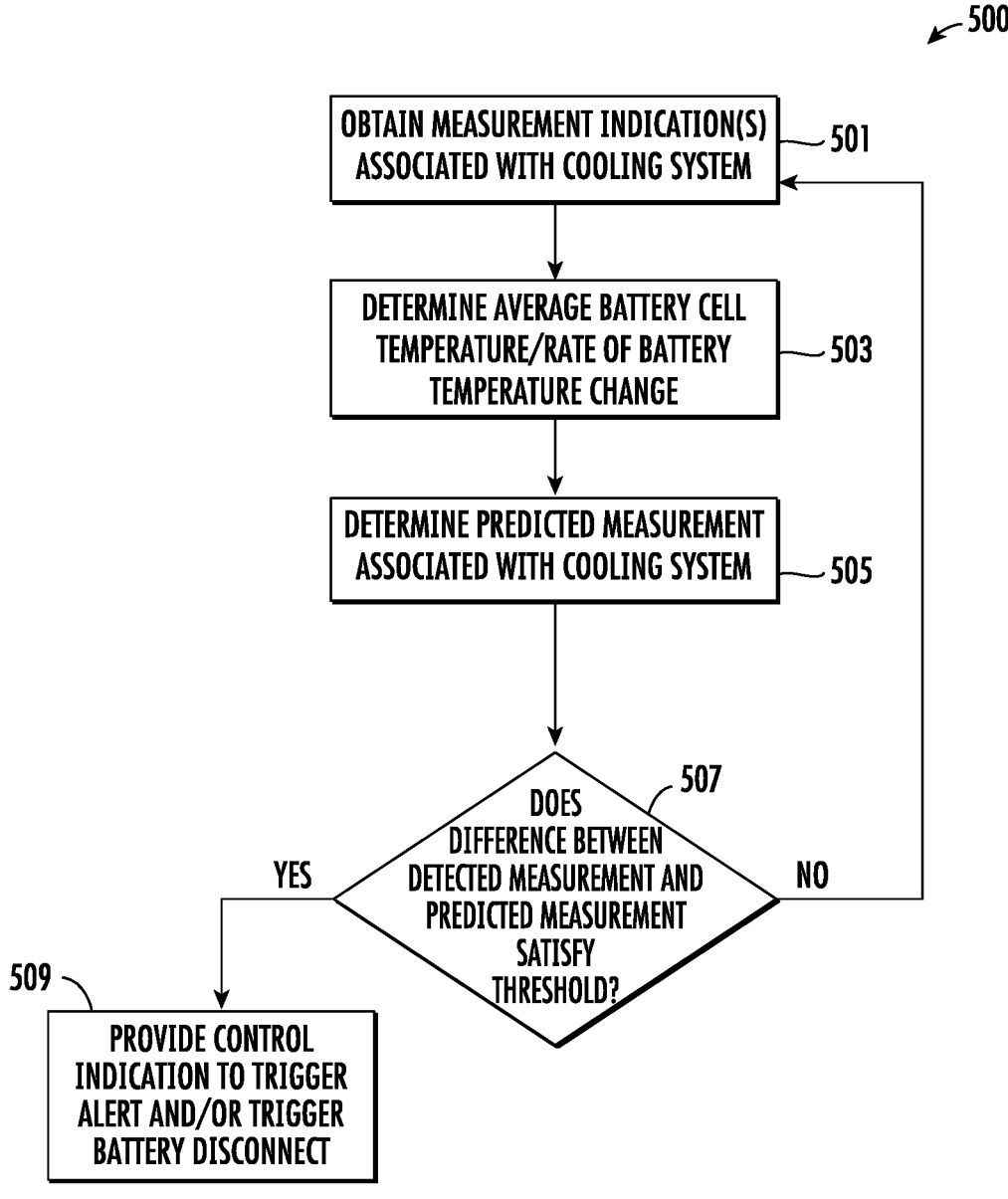
FIG. 5 illustrates another flowchart diagram depicting example operations in accordance with various embodiments of the present disclosure.

Referring now to FIG. 4 and FIG. 5, flowchart diagrams illustrating example operations 400 and 500 in accordance with various embodiments of the present disclosure is provided.

In some examples, the methods 400 and 500 may be performed by a processing circuitry (for example, but not limited to, an application-specific integrated circuit (ASIC), a central processing unit (CPU)). In some examples, the processing circuitry may be electrically coupled to and/or in electronic communication with other circuitries of the example apparatus, such as, but not limited to, a sensing element, a memory (such as, for example, random access memory (RAM) for storing computer program instructions), and/or a display circuitry (for rendering readings on a display).

In some examples, one or more of the procedures described in FIG. 4 and FIG. 5 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Referring now to FIG. 4, the example method 400 begins at step/operation 401. At step/operation 401, a processing circuitry (such as, but not limited to, the processing circuitry 301 of the controller component 300 illustrated in connection with FIG. 3, discussed above) obtains a first measurement indication associated with a first portion of a battery cooling system (e.g., one or more cooling pipes, or a particular set of cooling pipes). The first measurement indication may be a temperature value, pressure value, rate of change of pressure or temperature, and/or the like. In some embodiments, a sensing element (such as, but not limited to, the first sensing element 213 illustrated in connection with FIG. 2) may transmit the first measurement indication associated with the first portion of a battery cooling system (e.g., the first cooling pipe 202A, the third cooling pipe 202C, and the fifth cooling pipe 202E) to the processing circuitry.

Subsequent to step/operation 401, the example method 400 proceeds to step/operation 403. At step/operation 403, the processing circuitry obtains a second measurement indication associated with a second portion of a battery cooling system (e.g., one or more cooling pipes, or a particular set of cooling pipes). The second measurement indication may be a temperature value, pressure value, rate of change of pressure or temperature, and/or the like. In some embodiments, a sensing element (such as, but not limited to, the second sensing element 215 illustrated in connection with FIG. 2) may transmit the second measurement indication associated with the second portion of a battery cooling system (e.g., the second cooling pipe 202B and the fourth cooling pipe 202D) to the processing circuitry.

Subsequent to step/operation 403, the example method 400 proceeds to step/operation 405. At step/operation 405, the processing circuitry identifies a thermal runway condition based at least in part on the first measurement indication and the second measurement indication. By way of example, processing circuitry may determine that a thermal runway condition is present in relation to at least one battery cell in an instance in which a first pressure value associated with a first set of batteries exceeds a second pressure value associated with a second set of batteries. With reference to FIG. 2, discussed above, if a thermal runway condition is present in battery cell 201A from the first set of battery cells 201, then a first measurement obtained (e.g., pressure value) via the first sensing element 213 that is associated with a first portion of the battery cooling system 202 (e.g., the first cooling pipe 202A, the third cooling pipe 202C, and/or the fifth cooling pipe 202E) will be greater than a second measurement obtained (e.g., pressure value) via the second sensing element 215 that is associated with a second portion of the battery cooling system 202 (e.g., the second cooling pipe 202B and the fourth cooling pipe 202D). Accordingly, the processing circuitry may identify a thermal runway condition based at least in part by determining that a difference between a first measurement indication and second measurement indication satisfies a threshold (e.g., is equal to or above a predetermined threshold value). In some embodiments, the predetermined threshold value (e.g., pressure or temperature) may be determined based at least in part on/correspond with an unsafe operating temperature range associated with a battery component/battery cells. For example, a battery cell may have a safe operating temperature of up to 40° C. In the above example, a pressure or temperature value/range associated with a cooling system (e.g., cooling substance) may correspond with the safe operating temperature of the battery cell such that any value (e.g., pressure or temperature) above the safe operating value/range satisfies/exceeds the predetermined threshold value. By way of example, the safe operating temperature for the battery cell may be up to 40° C., and the safe operating temperature for a cooling system (e.g., cooling substance) associated therewith may be up to 32° C. In some examples, the processing circuitry identifies a thermal runaway condition based at least in part on a difference in a first rate of pressure and/or temperature change associated with a first portion of an example battery cooling system, and a second rate of pressure and/or temperature change associated with a second portion of the example battery cooling system.

Subsequent to step/operation 405, the method 400 proceeds to step/operation 407. At step/operation 407, in response to identifying a thermal runaway condition, processing circuitry may provide (e.g., generate, send, transmit, or the like) a control indication to trigger an alert and/or trigger deactivation of an example battery component. In some embodiments, triggering an alert may consist of providing a control indication to render a message on a display of a user interface in electronic communication with the processing circuitry. In some embodiments, triggering deactivation of the battery component may consist of causing a switch connected to a power supply of the battery component to be turned off in response to receiving a control indication.

Referring now to FIG. 5, another flowchart diagram illustrating example operations 500 in accordance with various embodiments of the present disclosure is provided. The example method 500 may be used to improve accuracy of one or more outputs generated by an example processing circuitry.

The example method 500 begins at step/operation 501. At step/operation 501, a processing circuitry (such as, but not limited to, the processing circuitry 301 of the controller component 300 illustrated in connection with FIG. 3, discussed above) obtains one or more measurement indications (e.g., temperature value, pressure value, rate of change of temperature or pressure, and/or the like) associated with at least a portion of an example battery cooling system (e.g., a cooling substance, such as a gaseous substance or coolant, in one or more cooling pipes). The one or more measurement indications may be obtained via one or more sensing elements, such as, but not limited to, first sensing element 213 and second sensing element 215 described above in connection with FIG. 2. In other words, the processing circuitry may cause one or more sensing elements to obtain measurements in response to receiving a control indication from the processing circuitry.

Subsequent to step/operation 501, the method 500 proceeds to step/operation 503. At step/operation 503, the processing circuitry determines an average battery cell temperature and/or rate of battery temperature change based at least in part on the one or more measurement indications (e.g., temperature value) associated with at least one battery cell. As noted above, a pressure value associated with a battery cooling system may change/increase as a result of heat absorbed from one or more battery cells. In some embodiments, processing circuitry may determine the average battery cell temperature based on temperature readings obtained via one or more temperature sensors that are associated with at least one battery cell of an example battery component. In various examples, the processing circuitry may obtain one or more measurements via a temperature sensor disposed within a cooling pipe, a pressure sensor disposed within a cooling pipe, combinations thereof, and/or the like. In some examples, measurements obtained via one or more temperature sensors operatively coupled to at least one cooling pipe may be utilized to determine an average battery cell temperature and/or rate of battery temperature change. In some examples, an example battery component/battery cell(s) may comprise one or more thermocouples that may be utilized to obtain measurements for determining an average battery cell temperature and/or rate of battery temperature change.

Subsequent to step/operation 503, the method 500 proceeds to step/operation 505. At step/operation 505, processing circuitry determines a predicted measurement associated with the battery cooling system (e.g., a predicted pressure value, a predicted rate of change in temperature, a predicted rate of change in pressure, or the like). In some embodiments, processing circuitry may generate a thermal model/ thermal resistance capacitance (RC) model for a battery component. The example model may be used to generate a predicted measurement with respect to the battery component (e.g., based at least in part on battery current, voltage, and/or resistance values). In some embodiments, the predicted measurement may be an average battery cell temperature.

Subsequent to step/operation 505, the method 500 proceeds to step/operation 507. At step/operation 507, processing circuity determines whether the difference between the obtained measurement indication(s) and the predicted measurement satisfies a predetermined threshold (e.g., by being equal to or exceeding a predetermined threshold value or range). In an instance in which the difference between the obtained measurement indication(s) and the predicted measurement fails to satisfy the predetermined threshold, the method 500 may return to step/operation 501 where the processing circuitry proceeds to obtain measurement indication(s) associated with the battery cooling system.

Subsequent to step/operation 507, the method 500 proceeds to step/operation 509. At step/operation 509, processing circuitry in response to determining that the difference between the obtained measurement indication(s) and the predicted measurement satisfies a predetermined threshold, the processing circuitry may provide (e.g., generate, send, transmit, or the like) a control indication to trigger an alert and/or trigger deactivation of an example battery component (e.g., cause an alert/message to be rendered on a display) and triggering deactivation of the battery component (e.g., provide a control indication to cause a switch connected to a power supply of the battery component to be turned off in response to receiving a control indication). Utilizing the method 500 depicted in FIG. 5, the accuracy of determinations being generated by the example processing circuitry can further be improved.

Utilizing the techniques and apparatuses discussed here, an effective system for detecting battery thermal runaway and disconnecting battery components/generating alerts in response thereto is provided. The example mobile devices and battery components are inexpensive and easy to manufacture and produce. Additionally, certain sensing elements (e.g., pressure sensors, and/or the like) offer robust performance and may be used over a long period of time in comparison to conventional techniques (e.g., gas detectors). Moreover, the apparatuses and systems described herein do not require additional and/or expensive sensing elements (e.g., a temperature sensor for each battery cell of a battery component) and are capable of detecting thermal runaway during early stages of the condition (e.g., prior to onset of safety venting).

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A battery component comprising:
a plurality of battery cells disposed within a housing;
a battery cooling system operatively coupled to the plurality of battery cells that is configured to absorb heat emitted by the plurality of battery cells, wherein:
   at least a first portion of the battery cooling system is associated with at least a first battery cell and a first sensing element that is configured to obtain at least a first measurement indication associated with a pressure change within the first portion of the battery cooling system based on the heat absorbed by the first portion of the battery cooling system from the first battery cell, wherein the first sensing element is a first pressure sensor; and
   at least a second portion of the battery cooling system is associated with at least a second battery cell and a second sensing element that is configured to obtain at least a second measurement indication associated with a pressure change within the second portion of the battery cooling system based on the heat absorbed by the second portion of the battery cooling system from the second battery cell, wherein the second sensing element is a second pressure sensor; and a controller component configured to determine a thermal runaway condition, wherein the controller component is in electronic communication with the first sensing element and the second sensing element, wherein the controller component determines the thermal runway condition associated with at least one of the plurality of battery cells by determining that a difference between the first measurement indication and the second measurement indication is at least greater than a predetermined threshold value.

2. The battery component of claim 1, wherein the controller component is further configured to:
   determine at least one of an average battery cell temperature and a rate of battery temperature change associated with at least one of the plurality of battery cells;
   determine a predicted measurement associated with the at least a first portion of the battery cooling system or the at least a second portion of the battery cooling system; and
   identify the thermal runaway condition in an instance in which the difference between the average battery cell temperature or the rate of battery temperature change and the predicted measurement satisfies a predetermined threshold value.

3. The battery component of claim 1, wherein the controller component is further configured to:
   in response to identifying the thermal runaway condition, provide a first control indication to trigger deactivating the battery component; and
   provide a second control indication to generate an alert.

4. The battery component of claim 1, wherein:
   each of the first measurement indication and the second measurement indication comprises at least one of a pressure value and a rate of pressure change.

5. The battery component of claim 1, wherein the battery component comprises lithium-ion or a lithium polymer.

6. The battery component of claim 1, wherein the at least a first portion of the battery cooling system and the at least a second portion of the battery cooling system each comprise one or more cooling pipes that each contain a cooling substance.

7. The battery component of claim 6, wherein the at least a first portion of the battery cooling system and the at least a second portion of the battery cooling system are thermally insulated from one another.

8. The battery component of claim 6, wherein the cooling substance comprises at least one of a gaseous substance, a coolant, a refrigerant, a liquid substance, and a gel.

9. The battery component of claim 1, wherein the battery component is configured for use in at least one of a portable electronic device, an electric vehicle, a robot, a data center, a renewable energy system, an airplane, or a ship.

* * * * *